United States Patent [19]
Frazier

[11] Patent Number: 5,926,996
[45] Date of Patent: Jul. 27, 1999

[54] FISHING LINE CONNECTOR

[75] Inventor: C. Leon Frazier, Seattle, Wash.

[73] Assignee: Pacific Industrial Supply Co., Inc., Seattle, Wash.

[21] Appl. No.: 08/967,695

[22] Filed: Nov. 12, 1997

[51] Int. Cl.⁶ .................................................. A01K 91/04
[52] U.S. Cl. .................... 43/43.1; 43/44.84; 43/44.89; 43/42.49; 24/908
[58] Field of Search .................................. 43/43.1, 44.83, 43/44.84, 44.89, 42.49, 44.9, 44.92, 42.74, 27.2, 27.4, 4, 8; 24/115 A, 115 H, 456, 483, 484, 570, 908, 910, 599.6

[56] References Cited

U.S. PATENT DOCUMENTS

| | | | |
|---|---|---|---|
| 430,043 | 6/1890 | Seiders et al. . | |
| 1,156,835 | 10/1915 | Butts . | |
| 2,033,701 | 5/1936 | Gibbs | 43/28 |
| 3,161,930 | 12/1964 | Crosson | 23/123 |
| 3,435,552 | 4/1969 | Caldwell | 43/43.15 |
| 3,533,184 | 10/1970 | Kerr | 43/44.84 |
| 3,893,605 | 7/1975 | Mew | 224/7 D |
| 4,149,336 | 4/1979 | Huse | 43/44.9 |
| 4,194,273 | 3/1980 | Williams | 24/222 |
| 4,630,388 | 12/1986 | Furlong | 43/27.4 |
| 5,129,177 | 7/1992 | Haigh et al. | 43/44.83 |
| 5,251,396 | 10/1993 | Haigh | 43/42.74 |
| 5,611,169 | 3/1997 | Mayer | 43/44.84 |
| 5,666,759 | 9/1997 | Thormodsen et al. | 43/42.74 |

FOREIGN PATENT DOCUMENTS

| | | |
|---|---|---|
| 2629984 | 10/1989 | France . |
| 681566 | 10/1952 | United Kingdom . |
| 1225769 | 3/1971 | United Kingdom . |
| 1583797 | 2/1981 | United Kingdom . |
| 2074207 | 10/1981 | United Kingdom . |

*Primary Examiner*—Jack W. Lavinder
*Attorney, Agent, or Firm*—Seed and Berry LLP

[57] ABSTRACT

A connecting system for attaching a gangion or snood to a fishing line having a connector with a tubular body having first and second opposed ends, forming a slit. The body has a cut-out forming a tongue with a central aperture for receiving the loop of a swivel. The connector is free to rotate on the line and is held against axial movement on the line by a pair of stops having teeth that are crimped tightly into the line to prevent their axial movement.

4 Claims, 1 Drawing Sheet

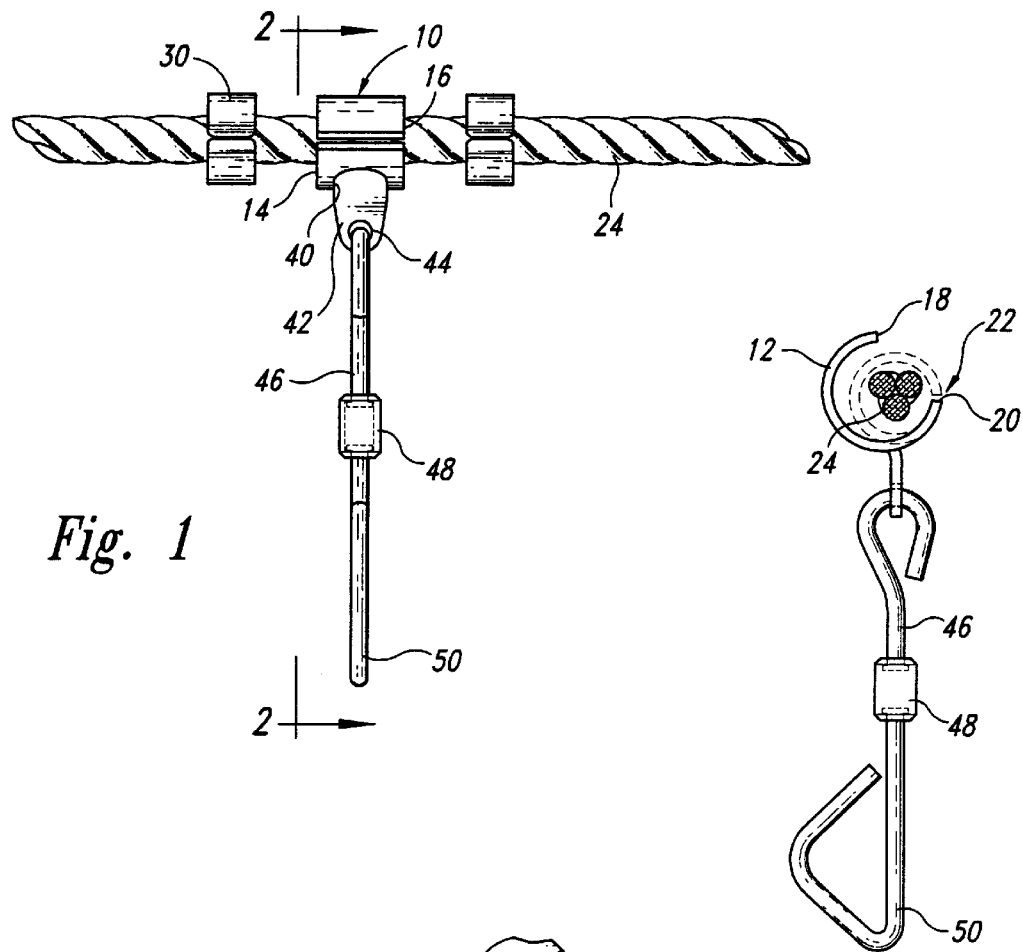
Fig. 1
Fig. 2
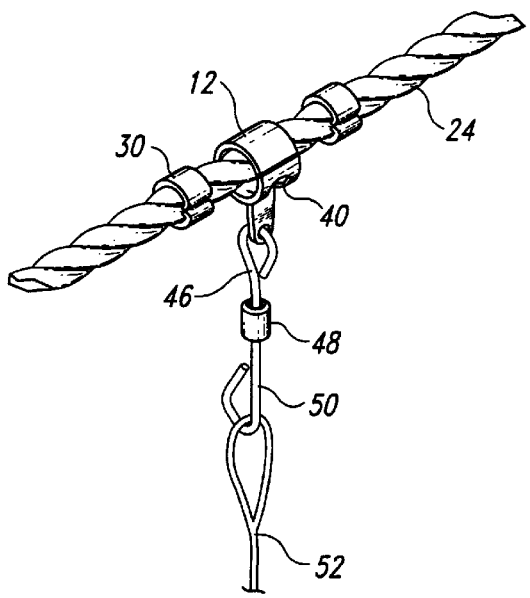
Fig. 3
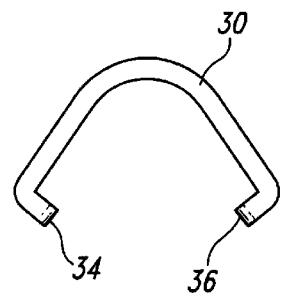
Fig. 4

FISHING LINE CONNECTOR

TECHNICAL FIELD

This invention relates to fishing lines, particularly long lines normally provided with snoods or gangions attached to the long line by connectors.

BACKGROUND OF THE INVENTION

Snoods or gangions are attached to a fishing line that may be miles long. A large number of connectors will therefore be needed on the line. It is important that the connector for the gangion attached to the line be strong and relatively inexpensive to manufacture.

SUMMARY OF THE INVENTION

It is an object to this invention to provide a fishing line connector that is relatively inexpensive to manufacture.

It is another object to this invention to provide a fishing line connector that is securely held on a line and is suitable for use on long lines which can connect a gangion and its hook to a long line.

Basically the invention includes a connector having a tubular body with first and second lateral edges and terminating in first and second opposed ends, the opposed ends forming a slit. The body has a cut-out forming a tongue with a central aperture, and this central aperture is adapted to receive the loop of one end of a swivel for connecting to a gangion or other fishing tackle between the connector and the fish hook.

BRIEF DESCRIPTION OF THE DRAWINGS

FIG. 1 is side elevation of a connector shown attached on a fishing line.

FIG. 2 is a section taken along the line 2—2 of FIG. 1.

FIG. 3 is an isometric of the connector showing partially the connection of a gangion.

FIG. 4 is a side elevation of a typical clip used to lock a connector onto a fishing line.

DETAILED DESCRIPTION OF INVENTION

The connector 10 is in form of tubular body 12 including a circumferential plane and having lateral first and second ends 14 and 16; and opposed end surfaces 18 and 20. The opposed end surfaces form a slit 22 having a gap, which when open is large enough to fit over the long line or fishing line 24 but which can be closed into the phantom line position shown in FIG. 2 and the solid line position shown in FIGS. 1 and 3 to become locked on the line. The internal diameter of the connector is greater than the external diameter of the line so that the connector is free to rotate about the line.

Since the connector can rotate about the line, it is held against axial movement along the line by a pair of conventional clips 30. Both the connector and the clips are made of stainless steel or other suitable material, such as plastic, that will hold its shape after being locked in place and be resistant to corrosive effects of salt water. Preferably the clip has a pair of teeth 34 and 36 so that when the clip is squeezed tightly into the line (FIG. 3), the teeth dig into the line, preventing the clips from moving axially along the line.

Thus, as is readily apparent and as is shown in the drawings, when the clips are locked into place, they act as stops to prevent the connector from sliding beyond the stops along the length of the line. This allows the connector to rotate about the line, but holds it in a relatively fixed position axially along the line.

The connector is formed with a cut-out 40, made by pressing out a tongue 42 from one of the ends 14 or 16. The cut-out lies in the circumferential plane of the tubular body and both the cut-out and the tongue are circumferentially spaced from the slit. The cut-out is located at the base of the tongue and having a length extending circumferentially along said tubular body from the base of the tongue. The tongue has a central aperture 44 which receives the open loop 46 of a conventional swivel 48. The opposite closed loop 50 of the swivel then can be attached to a gangion or snood 52 as shown in FIG. 3. In use, the connectors and stops are fitted over the line and then crimped tightly closed. The stops will be crimped to dig their teeth 34 and 36 into the line so that they do not move axially, and the connector will be tightly closed so that it cannot come free of the line, but yet is free to rotate freely around the line.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A connecting system for attaching a gangion or snood to a fishing line, comprising:

a connector having a tubular body, including a circumferential plane, with first and second ends of the tubular body terminating in first and second opposed end surfaces forming a slit having a gap that can fit over a fishing line, the tubular body being deformable to reduce the gap of the slit to a dimension that will not allow passage of the fishing line through the slit, the tubular body having an internal diameter when the gap is reduced greater than the external diameter of the fishing line so that the connector can rotate about the fishing line, the body having a cut-out, a tongue with a central aperture, said tongue having a length extending outwardly from the tubular body, the cut-out lying in the circumferential plane of the tubular body and located at the base of the tongue, said slit being spaced on said tubular body circumferentially from said tongue and said cut-out, said cut-out having a length extending circumferentially along said tubular body from the base of said tongue, said length of said cut-out being approximately the same as the length of said tongue;

the central aperture adapted to receive a loop of a swivel.

2. The connecting system of claim 1, further including stops positioned on a fishing line, the connector being placed on the fishing line between the stops.

3. The connecting system of claim 2, the stops each including a clip closeable tightly over said fishing line.

4. The connecting system of claim 1, said connector being made from a blank, with the cutout being bent out of the blank.

\* \* \* \* \*